(12) United States Patent  (10) Patent No.: US 7,442,143 B2
Gassmann et al.  (45) Date of Patent: Oct. 28, 2008

(54) DRIVE MODULE FOR A VARIABLE TORQUE DISTRIBUTION

(75) Inventors: Theodor Gassmann, Siegburg (DE); Mark Schmidt, Bonn (DE); Kurt Müller, Merzenich (DE)

(73) Assignee: GKN Driveline International GmbH, Lohmar (DE)

( * ) Notice: Subject to any disclaimer, the term of this patent is extended or adjusted under 35 U.S.C. 154(b) by 146 days.

(21) Appl. No.: 11/318,655

(22) Filed: Dec. 27, 2005

(65) Prior Publication Data

US 2006/0172845 A1 Aug. 3, 2006

(30) Foreign Application Priority Data

Jan. 28, 2005 (DE) ............. 10 2005 004 290

(51) Int. Cl.
 *F16H 48/04* (2006.01)
(52) U.S. Cl. ..................................... 475/221
(58) Field of Classification Search ........... 475/221, 475/225
 See application file for complete search history.

(56) References Cited

U.S. PATENT DOCUMENTS 5,692,987 A 12/1997 Shibahata et al.
6,056,660 A 5/2000 Mimura

FOREIGN PATENT DOCUMENTS

DE 103 42 164 A1 4/2005

*Primary Examiner*—Roger Pang
*Assistant Examiner*—Edwin A Young

(57) ABSTRACT

A drive module (5, 6) for a variable torque distribution in the driveline of a motor vehicle. The drive module (5, 6) has a first shaft (19) rotatably supported relative to a stationary housing (18); a second shaft (22) which is drivingly connected to the first shaft (19); and a transmission stage (25) arranged in the torque flow between the first and second shafts (19, 22). The transmission stage (25) has at least one planetary gear (27) and a rotating carrier element (32). A coupling (37) serves to couple the carrier element (32) relative to the housing (18). When coupled, torque transmission occurs from one of the first or second shaft (19, 22), to the other one of the two shafts. The housing (18), the first shaft (19), the second shaft (22), the transmission stage (25) and the coupling (37) form part of a unit adapted to attach to a drive (3).

18 Claims, 9 Drawing Sheets

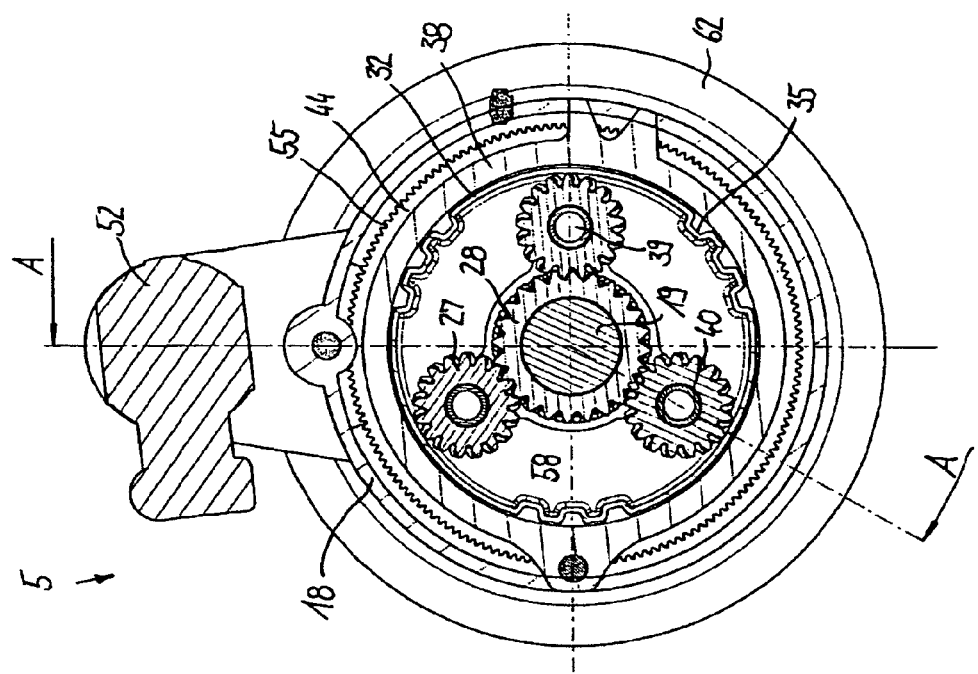
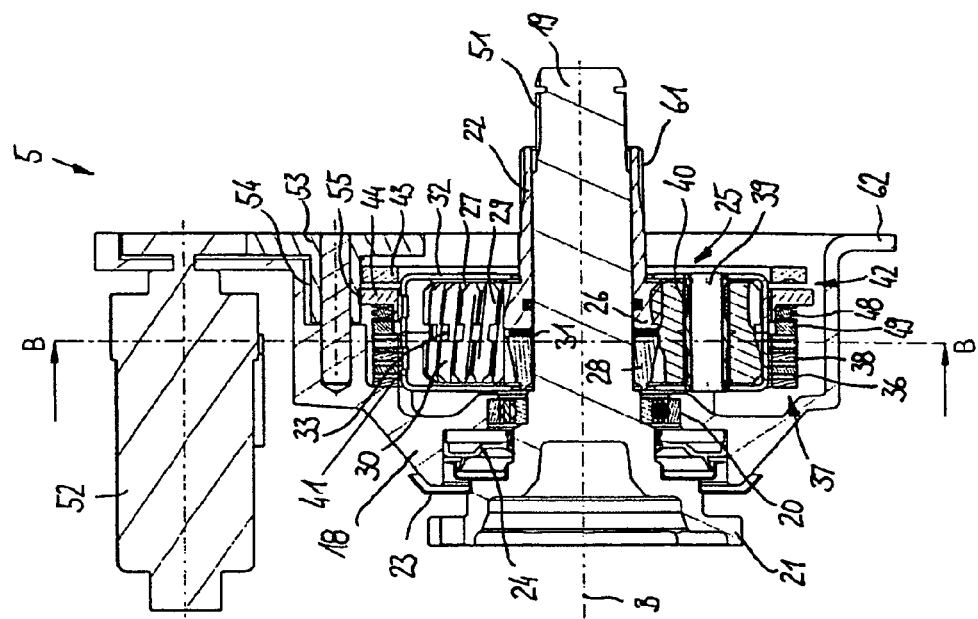
FIG. 3B
FIG. 3A

DRIVE MODULE FOR A VARIABLE TORQUE DISTRIBUTION

TECHNICAL FIELD

The invention relates to a drive unit for achieving a variable distribution of torque in the driveline of a motor vehicle.

BACKGROUND OF THE INVENTION

Drive assemblies for variable torque distribution normally include a differential with an input shaft and two output shafts which have a compensating effect relative to one another. The drive unit for variable torque distribution functions in that, prior to torque being distributed to the two output shafts, part of the torque introduced via the input shaft is branched off the differential carrier. The branched-off percentage of torque is additionally introduced into one of the two output shafts following the branching-off point for the remaining torque. For this purpose, there is provided a transmission stage and a coupling per output shaft. The transmission stage includes an input gear which is driven by the differential carrier and which accelerates or decelerates an output gear. By coupling the output gear to the associated output shaft of the differential, the associated output shaft is accelerated or decelerated. In this way, it is possible, if required, to transmit a greater amount of torque to the one of the two output shafts than to the other one of the output shafts in order to increase the driving stability of the motor vehicle. Such drive assemblies can be used for distributing torque between the two side shafts of an axle differential or for the controlled distribution of torque between the two axle shafts of a central differential of a motor vehicle driven by several axles.

U.S. Pat. No. 6,056,660 describes a drive unit for the driveline of a motor vehicle, which permits an active, i.e. controlled, variable distribution of torque between two output shafts. The drive unit includes a differential drive with a differential carrier and two side shaft gears which are rotatable supported therein and which are driven via differential gears rotating together with the differential carrier. A carrier element carrying a transmission stage is supported on each of the two side shafts. The transmission stage has a plurality of planetary gears which, by way of a first toothed portion, are connected to the differential carrier in a rotationally fast way and which, by way of a second toothed portion engage a sun gear which is firmly connected to the side shaft. Per side shaft, there is provided a multi-plate coupling which, for the purpose of braking a rotational movement of the respective carrier element, have a braking effect relative to the drive housing. In this way, an additional torque is applied to the respective side shaft.

U.S. Pat. No. 5,692,987 proposes a further differential assembly which permits an active torque control between a first and a second output shaft. The differential assembly includes a planetary differential, a transmission stage with a carrier element and two couplings. The couplings are arranged so as to adjoin one another and be supported relative to the stationary drive housing. One coupling serves to brake the carrier element, so that an additional torque is transmitted to the first output shaft. The other coupling serves to brake the first output shaft, so that an additional torque is transmitted to the second output shaft. Overall, the design of the differential assembly is relatively complex.

From DE 103 42 164 A1 there is known a further drive unit for actively controlling the torque in the driveline of a motor vehicle. It includes a differential with a differential carrier which, via a transmission stage, drives two coupling carriers of multi-plate couplings. The transmission stages are designed in such a way that a transfer to high speeds takes place, so that, by closing one of the two couplings, an additional torque can be transmitted to the associated output shaft.

These assemblies are complex and present assembly difficulties. It would be desirable to provide simply designed and easy-to-assembly drive assemblies featuring a variable torque distribution.

SUMMARY OF THE INVENTION

In accordance with one embodiment of the invention, a drive module for a variable torque distribution in the driveline of a motor vehicle is provided. The module comprises a first shaft which is rotatable supported around an axis of rotation relative to a stationary housing; a second shaft which is coaxially arranged relative thereto and which is drivingly connected to the first shaft; a transmission stage arranged in the torque flow between the first shaft and the second shaft, the transmission stage having at least one planetary gear and a carrier element which carries the at least one planetary gear and which is able to rotate around the axis of rotation; a coupling which is supported in the housing and serves to couple the carrier element relative to the housing, wherein, as a result of coupling the carrier element relative to the housing, there takes place a transmission of torque from the one of the two shafts, i.e. the first or the second shaft, to the other one of the two shafts, i.e. the first shaft or the second shaft. The housing, the first shaft, the second shaft, the transmission stage and the coupling form part of a unit, wherein an attaching mechanism is provided at the housing to be able to attach the unit to a drive. The first shaft and the second shaft also comprise an attachment mechanism to be connected in a rotationally fast way to an input and output, respectively, of the drive.

An advantage of this solution is that the drive module, as a unit, features a simple design and can easily be attached to a separate differential drive. The attaching mechanism at the differential drive is also uncomplicated. The term "unit," in this context, more particularly refers to a pre-assembled functional able unit whose parts cannot readily be lost or dislocated. For attaching the unit to a differential drive, the first shaft is connected in a rotationally way to a side shaft gear of a differential drive in the form of an output, whereas the second shaft is connected in a rotationally fast way to the differential carrier in the form of an input. Such connections can be achieved by plug-in type connections, for example. The transmission stage achieves a transfer to high speeds from the second shaft to the first shaft, so that, by closing the coupling, an additional torque is applied to the first shaft.

A further advantage of the inventive drive module is that the unit can be variably used for different applications. For example, the drive module can be used as a unit at an axle differential for variably distributing the torque to the two side shafts of the axle. Alternatively, the drive module can be used as a unit at a central differential in a motor vehicle with two driven axles. In this case, it serves to variably distribute the torque to a first propeller shaft for driving the first axle and to a second propeller shaft for driving the second axle. It is also contemplated to provide the inventive drive module both at an axle differential and at a central differential in the driveline of a motor vehicle with a plurality of driven axles.

According to a further embodiment, the drive module comprises an axial setting device for actuating the coupling, the setting device being accommodated in the housing. By integrating the axial setting device into the unit, production and assembly procedures are simplified further. The axial setting device can be provided in the form of a ball ramp assembly controlled by an electric motor. The ball ramp assembly comprises two discs which are rotatable relative to one another and which, for the purpose of receiving balls, comprise pairs of ball grooves whose depth varies in the circumferential direction. One of the two discs is axially displaceable in order to load the coupling. Using a mechanical axial setting device is advantageous in that it permits an accurate control of the coupling. The ball ramp assembly requires little space, which enables the drive module to be used flexibly. The electric motor for driving the ball ramp assembly can be arranged in such a way that the entire unit can be adapted to the respective installation situation in an optimum way. Using a mechanical axial setting device does not exclude other possibilities. Of course, the coupling can also be actuated by an electro-hydraulically controlled axial setting device.

According to another embodiment, the transmission stage comprises a first sun gear which is connected in a rotationally fast way to the first shaft and which engages a first toothed portion of the at least one planetary gear, as well as a second sun gear which is connected in a rotationally fast way to the second shaft and which engages a second toothed portion of the at least one planetary gear. The first and the second toothed portion of the at least one planetary gear can be identical in design, with the first and the second sun gear comprising different numbers of teeth. This results in a particularly compact transmission stage. The design of the two-toothed portions of the planetary gear has particularly advantageous effects on production and assembly. However, other solutions are also feasible; for example the two toothed portions of the at least one planetary gear could comprise different numbers of teeth in order to achieve a change in speed between the first and the second shaft.

The coupling can be provided in the form of a multi-plate coupling which comprises outer plates connected to the housing in a rotationally fast way, and inner plates connected to the carrier element in a rotationally fast way, with the outer plates and inner plates being arranged so as to alternate. The multi-plate coupling runs under "wet" conditions, i.e. for cooling purposes, it runs in lubricating oil.

According to yet a further embodiment, the carrier element comprises two carrier parts in the form of half a dish, having a base and a casing. After the at least one planetary gear has been inserted, the two carrier parts are firmly connected to one another. The two carrier parts are can be produced as formed parts out of plate metal. According to another aspect, the carrier element, the at least one planetary gear, the first sun gear and the second sun gear represent parts of a pre-assembled unit. For assembly purposes, the at least one planetary gear, the first sun gear and the second sun gear are inserted into one of the two carrier parts. Then the second carrier part is arranged on the end face of the first carrier part and the two carrier parts are welded to one another around their circumferences. This is particularly advantageous as production and assembly are simplified, and only a small number of components are required. A further advantage is provided in that the first sun gear and the second shaft are produced in one piece. The sun gear and the second shaft are produced in one piece, i.e. integral forming a hollow shaft. The hollow shaft is rotatable supported on the first shaft, more particularly, by way of a friction bearing.

According to a particularly advantageous embodiment, an engaging mechanism allowing the rotationally fast engagement of inner coupling plates is provided at an outer circumferential face of the carrier element. There is thus achieved a particularly compact design of the drive module which comprises only a short axial length. Furthermore, the two discs of the ball ramp assembly can be arranged coaxially relative to the carrier element, with the two discs being positioned outside the carrier element. This measure, too, allows a short axial length. Whereas the one disc is circumferentially and axially firmly held in the housing, the other disc is radically supported via the balls relative thereto and Rota tingly drivable.

According to a preferred embodiment, the housing comprises an aperture at its end associated with the attaching mechanism. This is advantageous for certain applications wherein the differential and the drive module can use a common lubricant. Furthermore, this embodiment is particularly lightweight. Alternatively, the housing can comprise a cover at its end associated with the attaching mechanism, and a seal which seals a housing interior towards the outside. In this way, the unit is complete and fully sealed so that, apart from adapting the attaching dimensions, no further measures have to be taken to adapt the unit to the installation situation. A closed drive module is advantageous for certain applications where it is necessary to separate the inner spaces of the drive module and of an attached drive, i.e. the differential drive. Normally, a low-viscosity lubricant is used for cooling multi-plate couplings, whereas a differential drive requires a lubricant with a higher viscosity. For connecting the unit to a differential drive, the attaching mechanism can comprise a flange which makes it easy to mount the unit on the differential drive.

A further solution is advantageous in a motor vehicle having only one driven axle with an axle differential for driving two side shafts, wherein the axle differential comprises a differential carrier rotatable supported in a stationary differential housing, two side shaft gears rotatable supported in the differential carrier as well as a plurality of differential gears engaging the two side shaft gears. A first drive module according to the above design is provided wherein its housing is firmly connected to the stationary differential housing via a connector, wherein the first shaft of the drive module is connected in a rotationally fast way to the one of the two side shaft gears and wherein the second shaft of the drive module is connected in a rotationally fast way to the differential carrier. A second drive module according to the above design is also provided wherein its housing is firmly connected to the stationary differential housing via a connector, wherein the first shaft of the second drive module is connected in a rotationally fast way to the other one of the two side shaft gears and wherein the second shaft of the second drive module is connected in a rotationally fast way to the differential carrier. In this case, the drive module serves to achieve a variable torque distribution between the two side shafts of the driven axle. By asymmetrically distributing the torque to the two side shafts, it is possible to generate an active yaw moment at the vehicle, thus permitting a higher speed through curves and improving the vehicle behavior when entering a curve. Furthermore, it is possible to influence the control of the driving dynamics of the motor vehicle without losing any driving force.

An additional or alternative solution is advantageous in a motor vehicle with two driven axles and a central differential for distributing the torque to the two axles, wherein the central differential comprises a differential carrier rotatable supported in a stationary differential housing, and two axle gears are rotatable supported in the differential carrier as well as a plurality of differential gears engaging the axle shaft gears. A drive module according to the above design is provided wherein its housing is firmly connected to the stationary differential housing via a connector, wherein the first shaft of the drive module is connected in a rotatable fast way to the one of the two axle shaft gears and wherein the second shaft of the drive module is connected in a rotationally fast way to the differential carrier. In this case, the drive module serves to achieve a variable torque distribution between the first driven axle, for example the front axle, and the second driven axle, for example the rear axle. By asymmetrically distributing the torque to the two driving axles, it is possible to generate an active yaw moment at the motor vehicle, which offers the above-mentioned advantages.

In addition to the central differential, each of the two axle differentials can be provided with two inventive drive modules. On the one hand, this achieves an asymmetric distribution of the torque between the two driving axles. On the other hand, it is possible to asymmetrically distribute the torque between the two side shafts being part of a driving axle. In this way, it is possible to distribute torque individually or variably to all the wheels, thus maximizing the driving stability of the motor vehicle.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

Figure 1:
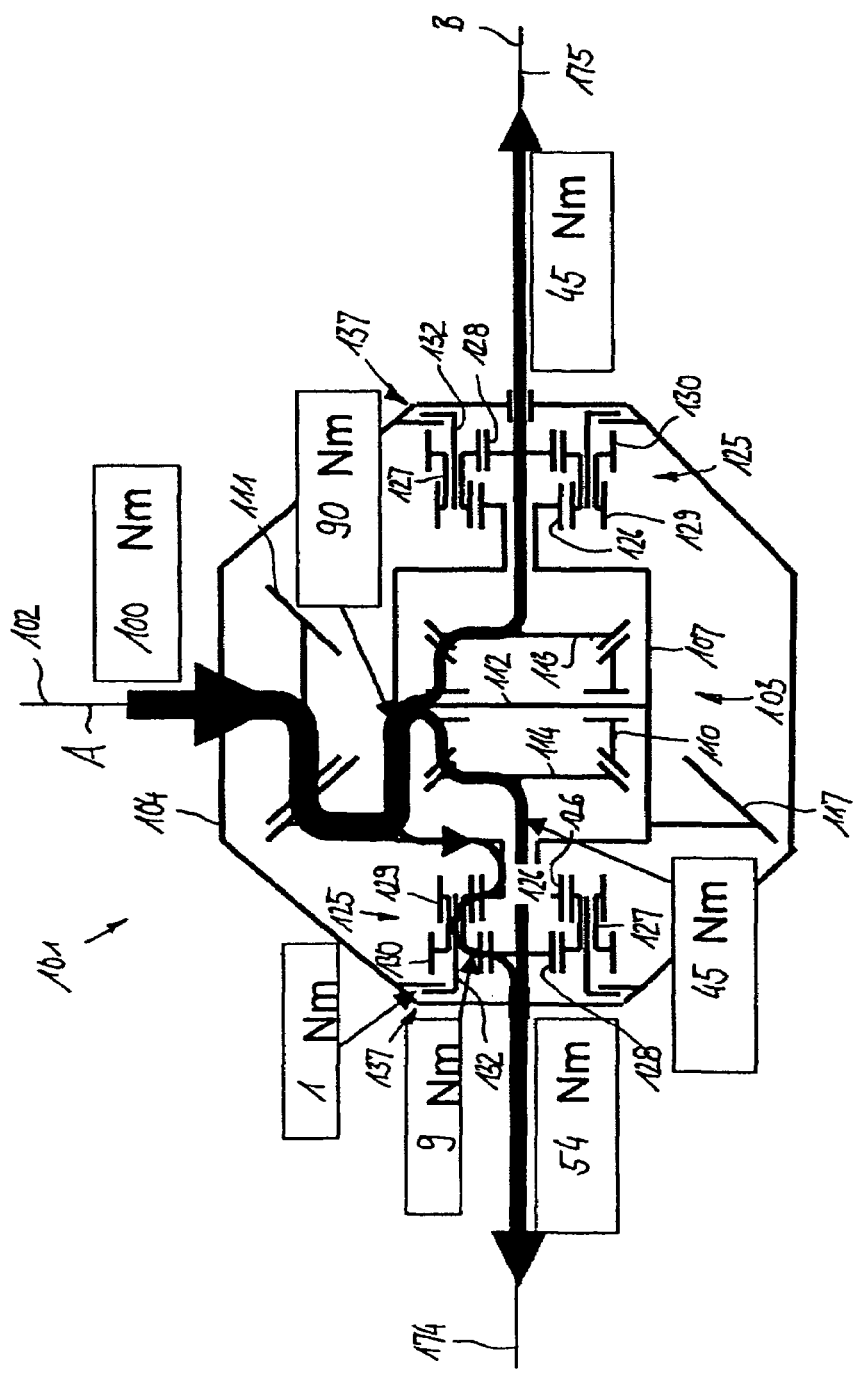
FIG. 1 shows a drive unit according to the state of the art as a diagram with an exemplary torque distribution.

FIG. 1 is a diagrammatic illustration of a drive unit 101 providing a variable torque distribution for the driveline of a motor vehicle, such as it is known from the state of the art. The drive unit 101 is driven via a driveshaft 102 by a multi-stage gear (not shown) and the incoming torque is distributed onto two side shafts 174, 175. The drive unit comprises a differential drive 103 with a differential carrier 107 which is rotatable supported in a stationary differential housing 104 around an axis of rotation B. A crown gear 117 which engages a bevel gear 111 connected to the driveshaft 102 and which is driven thereby is connected to the differential carrier 107. In the differential carrier 107, a plurality of differential gears 110 are rotatable supported on journals 112 which are positioned perpendicularly relative to the axis of rotation B and which rotate with the differential carrier 107. The teeth of the differential gears 110 are engaged by the teeth of two side shaft gears 113, 114 which serve to transmit torque to the side shafts.

Two transmission stages 125 for variably distributing torque to the side shafts 174, 175 are arranged so as to laterally adjoin the differential drive 103. As these are identical in design, only one will be described below by way of example. Each transmission stage 125 comprises a first sun gear 126 connected in a rotationally fast way to the differential carrier 107, a plurality of planetary gears 127 whose teeth engage those of the first sun gear 126, as well as a second sun gear 128 which engages the planetary gears 127 and which is connected in a rotationally fast way to the respective side shaft 174, 175. The planetary gears 127 each comprise two toothed portions 129, 130 one of which engages the first sun gear 126 and the other engages the second sun gear 128. In order to achieve a change in speed, the two sun gears 126, 128 comprise different numbers of teeth, and the two toothed portions 129, 130 of the planetary gears 127 also comprise different numbers of teeth relative to one another. The planetary gears 127 are rotatable received on a carrier element 132 which is able to rotate jointly with the planetary gears 127 around the axis of rotation B. The carrier element 132 can be coupled via a coupling 137 to the housing 104 in order to transmit an additional torque to the associated side shaft 174, 175.

By way of example, the following describes the torque flow through the drive unit 101. It can be seen that first a torque of 100 Nm is introduced by the driveshaft 102 via the crown gear 117 into the differential carrier 107. Under normal driving conditions, i.e. with freely rotating carrier elements 132, the incoming torque is uniformly distributed to both side shaft gears 113, 114 at a 50:50 ratio. However, if the actual driving dynamics require a greater torque to be applied to one of the two wheels of the motor vehicle, the respective transmission stage 125 is activated. It can be seen that in the present case a greater torque has to be transmitted to the left-hand side shaft 174, i.e. to the left-hand wheel (not shown). For this purpose, the left-hand coupling 137 is activated, i.e. the carrier element 132 which previously freely rotated around the axis of rotation is braked relative to the differential housing 104. A percentage of torque which will be transmitted via the sun gear 126 and via the planetary gears 127 to the left-hand side shaft 174 is branched off the differential carrier 107. In the present case, the torque percentage branched off the differential carrier 107 amounts to 10 Nm, so that a torque value of only 90 Nm is applied to the differential gears. The torque introduced via the differential gears 110 is uniformly distributed to the two side shaft gears 113,114, i.e. a torque value of 45 Nm to each of the side shafts. The torque value of 10 Nm additionally branched off the differential carrier 107 is added to the left-hand side shaft 174. As a result of heat losses in the coupling 137, a torque of approximately 1 Nm is lost, so that a total of 9 Nm is transmitted to the left-hand side shaft, with a total of 54 Nm being introduced into the left-hand side shaft 174. Thus, overall, there is obtained a ratio of 54:45 Nm between the left-hand wheel on the outside of the curve and the right hand wheel on the inside of the curve.

Figure 2:
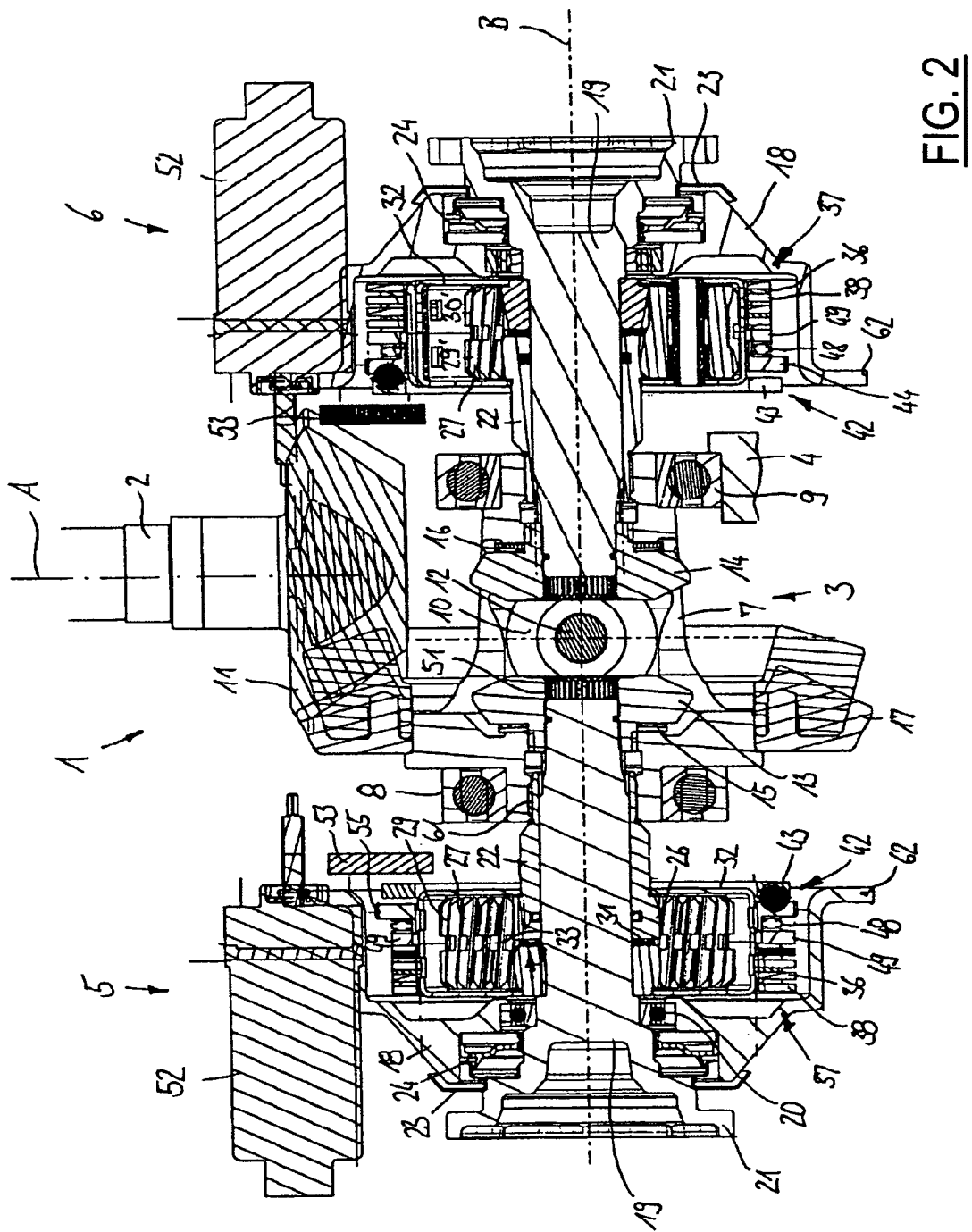
FIG. 2 is a longitudinal section through a drive unit with an inventive drive module.

FIG. 2 shows a drive unit 1 having a differential drive 3 arranged in a differential housing 4 (shown only partially) and two inventive drive modules 5, 6. Apart from the inventive drive modules 5, 6, the design and functioning of the drive unit 1 largely correspond to those shown in FIG. 1, so that to that extent reference is made to the description of same. Identical components have been given reference numbers reduced by 100. The inventive drive modules 5, 6 are provided in the form of separate units and serve for the variable distribution of torque to the two side shafts.

The differential drive 3 comprises a differential carrier 7 with a crown gear 17 which is connected to the differential carrier 7 in a rotationally fast way, which engages a bevel gear 11 connected to the driveshaft 2 and is driven by the bevel gear 11. The driveshaft 2 is rotatable supported in the differential housing 4 around the longitudinal axis A by a rolling contact bearing (not illustrated). The differential carrier 7 comprises two sleeve-shaped projections by which it is rotatable supported in the differential housing 4 around the axis of rotation B by rolling contact bearings 8, 9. In the differential carrier 7 there are rotatable supported several differential gears 10 on journals 12 positioned perpendicularly relative to the axis of rotation B, which differential gears 10 rotate in the differential carrier 7. Two side shaft gears 13, 14 which serve to transmit torque to the drive modules 5, 6 and to the associated side shafts 19 respectively engage the differential gears 10. The side shafts gears 13, 14 are rotatable supported in the differential carrier 7 on the axis of rotation B. There are provided abutment discs 15, 16 for supporting the axial expansion forces generated by the transmission of torque from the differential gears 10 to the side shaft gears 13, 14 relative to the differential housing 4.

Figure 3C:
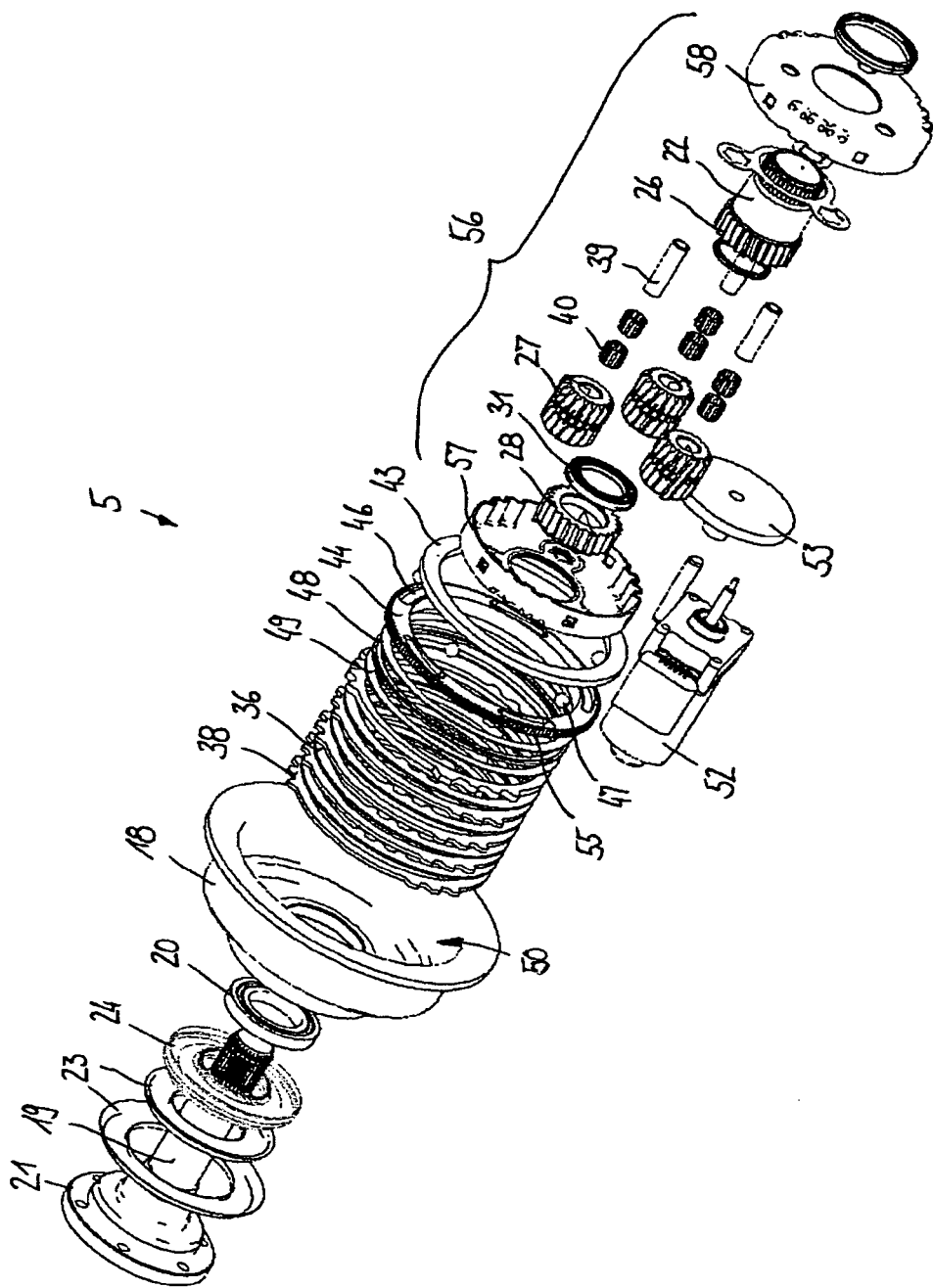
FIG. 3 shows the drive module according to FIG. 2:
A) in a longitudinal section;
B) in a cross-section; and
C) in a perspective illustration in an exploded view.

The two drive modules 5, 6 are arranged mirror-symmetrically relative to the central plane of the differential drive 3 extending through the journal axes. As the two drive modules 5, 6 correspond to each other in respect of their design and functioning, only one will be described below by way of example; it is shown in the form of a detail in FIGS. 3A, 3B and 3C. FIG. 3A is a longitudinal section along line A-A of FIG. 3B. FIG. 3B is a cross-section view taken along line B-B of FIG. 3A. Finally, FIG. 3C is a perspective illustration in an exploded view.

Each module 5, 6 comprises a housing 18 in which a first shaft 19 is rotatable supported by a bearing 20. The first shaft 19 is connected in a rotationally fast way via longitudinal teeth 51 to the associated side shaft 13, 14 of the differential drive 3. A second shaft 22 is rotatable supported by a friction bearing on the first shaft 19 so as to extend coaxially relative to said first shaft 19. The second shaft 22 is connected in a rotationally fast way to the differential carrier 7 via longitudinal teeth 61. At its end facing away from the differential drive 3, the first shaft 19 comprises a flange 21 for providing a connection with an associated vehicle side shaft (not illustrated here). The first shaft 19 is rotatable supported relative to the housing 18 by a rolling contact bearing and sealed by a contact-free sealing cap 23 and a contacting sealing ring 24.

The first and the second shaft 19, 22 are connected to one another for torque transmitting purposes via a transmission stage 25. The transmission stage 25 comprises a first sun gear 26 which is integrally connected to the second shaft 22, a plurality of planetary gears 27 engaging the first sun gear 26, as well as a second sun gear 28 engaging the planetary gears 27 and connected in a rotationally fast way to the first shaft 19 via longitudinal teeth. The planetary gears 27 are each produced in one piece and comprise two toothed portions 29, 30 one of which engages the first sun gear 26 and the other of which engages the second sun gear 28. The teeth are helical teeth in order to achieve an advantageous NVH behavior (noise vibration harshness), with the helical teeth being designed in such a way that any axial forces acting on the sun gears 26, 28 during the transmission of torque are directed towards each other. Between the two sun gears 26, 28 there is provided an axial bearing 31 which ensures axial support of the two sun gears 26, 28 relative to one another. To ensure that there is sufficient space between the axial bearing 31 and the planetary gears 27, the planetary gears 27 comprise grooves 33 extending in the region of overlap with the axial bearing 31. However, if a smaller axial bearing 31 is used, the grooves in the planetary gears could be excluded. In order to achieve a change in speed between the first shaft 19 and the second shaft 22, the two sun gears 26, 28 each comprise a different number of teeth. The numbers of teeth of the planetary gears 27 and of the sun gears 26, 28 are selected to be such that between the first shaft 19 and the second shaft 22, a difference in speed of up to 20% is achieved.

Figure 4:
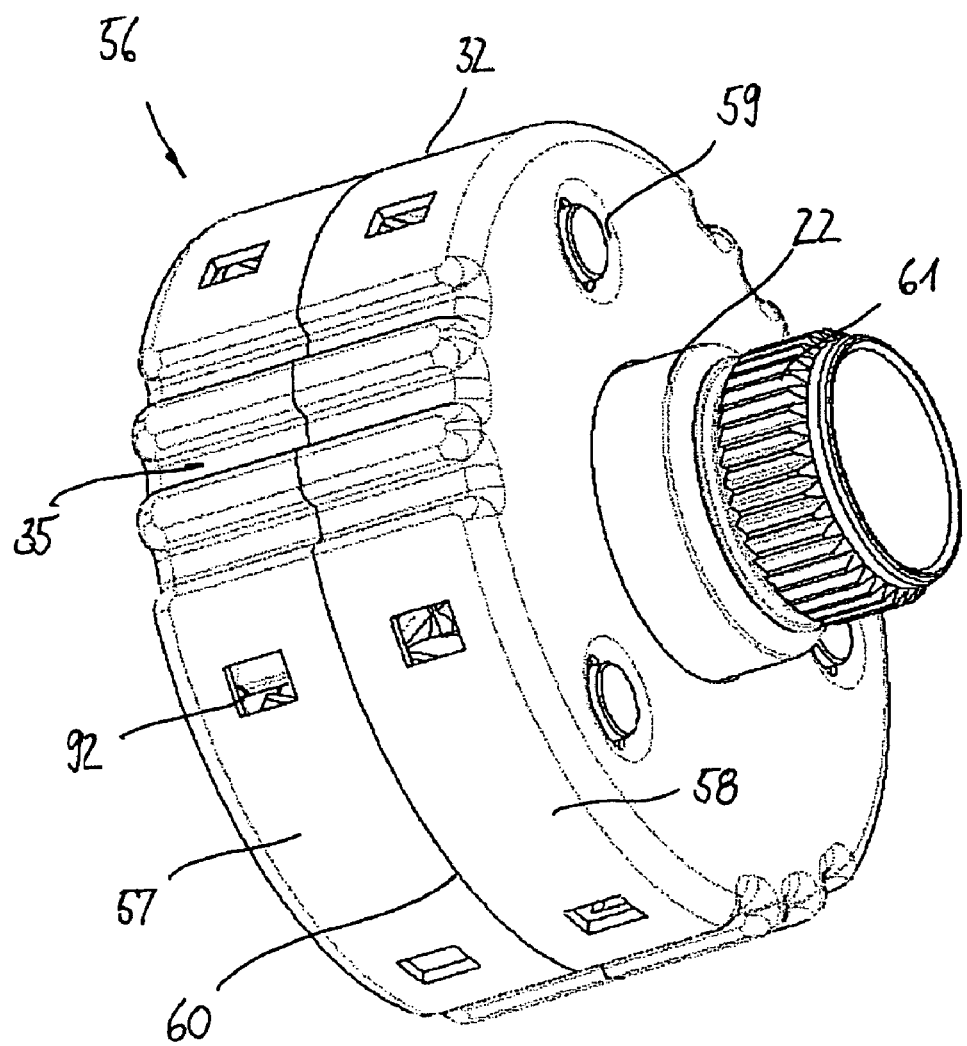
FIG. 4 shows the pre-assembled unit according to FIG. 2 as a detail in a perspective view.

The planetary gears 27 are rotatable received on journals 39 in a common carrier element 32 by needle bearings. The carrier element 32 is basket-shaped and largely closed towards the outside. The carrier element 32 is produced from two cup-shaped formed parts 57, 58 which may be plate metal and which, after the planetary gears 27 and the sun gears 26, 28 have been inserted, are firmly connected to one another, such as by welding. The carrier element 32, together with the planetary gears 27, the sun gears 26, 28 and the second shaft 22, form a pre-assembled unit 56 which is easy to slide on to the first shaft 19. The pre-assembled unit 56 is shown in the form of a detail in FIG. 4. It can be seen that, at its outer circumferential face 34, the carrier element 32 comprises engaging mechanisms 35 which, for torque transmitting purposes, can be engaged by the inner plates 32 of a coupling 37. The two cup-shaped carrier parts 57, 58 each comprise axial bores 59 into which the journals 39 are inserted and on which the planetary gears 27 are supported by needle bearings. Furthermore, a continuous weld 60 is shown which connects the two carrier parts 57, 58 to one another. For introducing lubricant into the carrier element 32, the outer circumferential face 34 is provided with radial apertures 92 through which lubricant can flow from the interior of the housing 18 into the interior of the carrier element 32.

Referring again to FIG. 3, the coupling 37 serves for coupling the carrier element 32 together with the planetary gears 27 to the housing 18 in order to branch off an additional torque directly from the differential carrier 7 and transmit same via the second shaft 22 and the transmission stage 25 to the first shaft 19. The coupling 37 is provided in the form of a multi-plate coupling and, in addition to the inner plates 36, comprises outer plates 38 which alternate with the inner plates 36 and which are held in a rotationally fast way relative to the housing 18. The plate package of outer plates 39 and inner plates 36 is axially supported on a supporting face 41 relative to the housing 18 and is actuated by an axial setting device 42.

The axial setting device 42 is provided in the form of a ball ramp assembly and comprises two discs 43, 44 which are rotatable relative to one another and which, for receiving balls 47, comprise pairs of ball grooves 45, 46 whose depth varies in the circumferential direction. One of the two discs is provided in the form of a supporting disc 43 which is axially supported relative to the housing 18. The other one of the two discs is provided in the form of a setting disc 44 which can be rotated relative to the supporting disc 43 and is axially displaceable in order to load, with an axial force, the plate package via an axial bearing 48 and a pressure plate 49. In this way, the coupling 37 is closed, so that the carrier element 32 is braked relative to the housing 18.

The ball ramp assembly 42 is controlled by an electric motor 52 via a pinion shaft 53 which is rotatable supported in the housing 18. The pinion shaft 53 comprises teeth 54 which engage counter teeth 55 at the setting disc 44. The electric motor 52 is controlled by an electronic control device (not illustrated) which serves to control the driving dynamics of the motor vehicle.

FIG. 3 shows that, in the direction towards the differential drive 3, the housing 18 comprises an attaching mechanism 62 in the form of a flange which surrounds an aperture 50. For assembly purposes, the unit shown is bolted via the flange 62 to the differential housing 4, with the first shaft 19 being connected in a rotationally fast way to the associated side shaft gear 13 of the differential drive 3 via a plug-in connection 51. At the same time, the second shaft 22, again via a plug-in connection 61, is connected in a rotationally fast way to the differential carrier 7. After completion of the assembly procedure, the differential drive 3 and the drive module 5 enclose a common interior and use a common lubricant.

Figure 5:
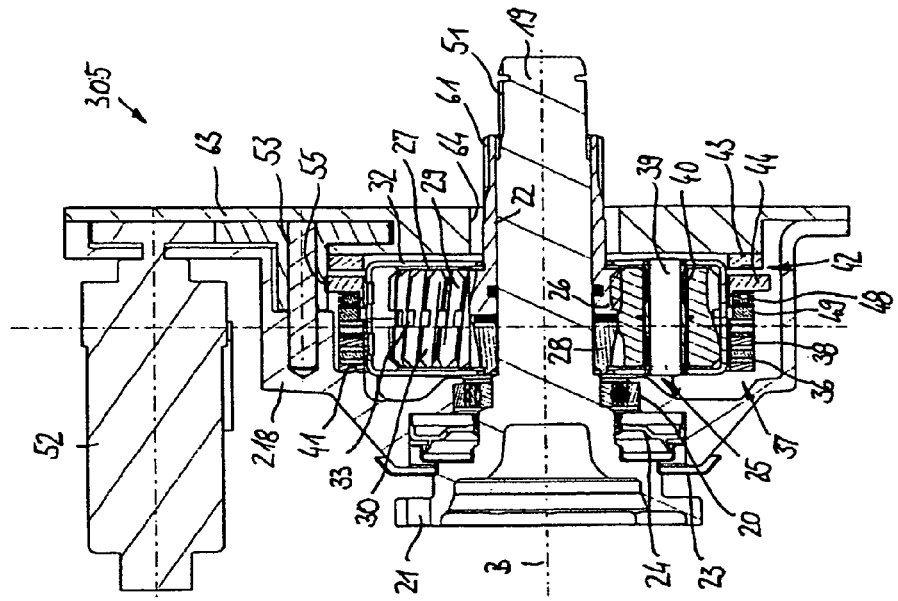
FIG. 5 is a longitudinal section through a second embodiment of an inventive drive module, with a seal.

FIG. 5 shows an alterative embodiment of an inventive drive module 205 which largely corresponds to the drive module according to FIGS. 2 and 3 and to whose description reference is hereby made. Identical components have been given the same reference numbers. Modified components have been indexed by 200. The present drive module 205 is characterized by the housing 218 comprising a cover 63 which closes the unit towards the outside. On its radial inside, the cover 63 comprises a bore 64 for receiving a sealing ring 65 which is healingly supported on the second shaft 22. In this way, the unit 205 is completely independent of the differential gear 3 to which it has to be attached. This is advantageous in that for the purpose of cooling and lubricating the drive module 205, it is possible to use a different lubricant than the lubricant for the differential gear 3.

Figure 6:
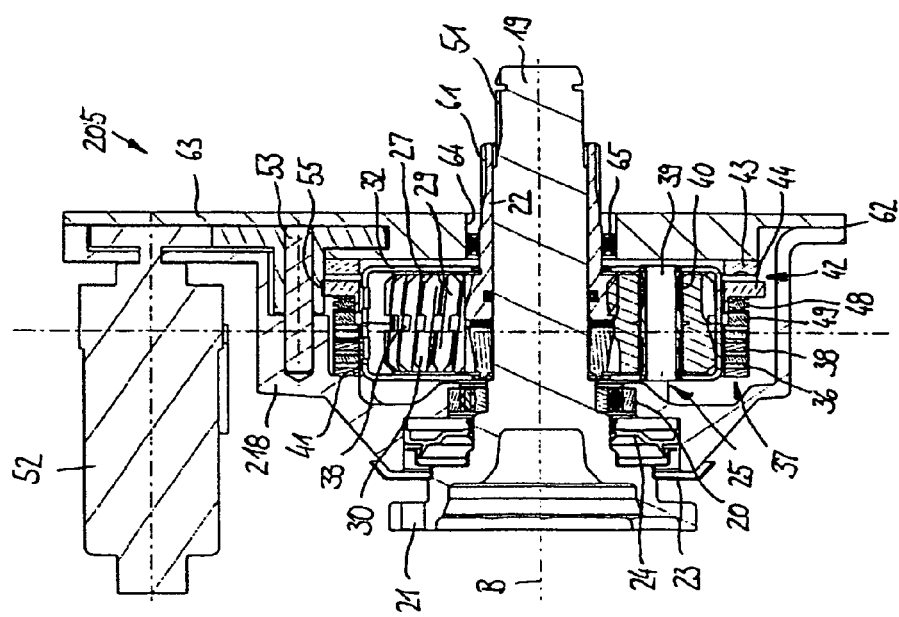
FIG. 6 is a longitudinal section through a third embodiment of an inventive drive module, without a seal.

FIG. 6 shows a further similar embodiment of an inventive drive module 305. It largely corresponds to the drive modules according to FIGS. 2 and 3 and according to FIG. 5 respectively to whose description reference is hereby made. Identical components have been given the same reference numbers. A distinguishing feature of the present drive module 305 is that the seal between the cover 63 and the second shaft 22 has been eliminated. It is thus possible to use the same lubricant for the drive module 305 and for the differential drive 3, which lubricant can enter through the annular gap 64. At the same time, the cover 63 prevents individual components from falling out of the housing 218 when being handled.

The following describes different applications in which an inventive drive module can be used to advantage. For each application, any of the inventive drive units 5, 6, 205, 305 could be used.

Figure 7:
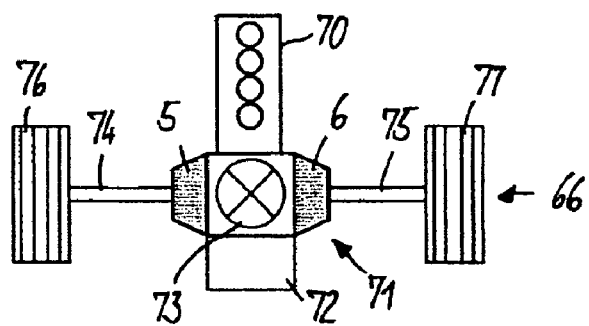
FIG. 7 shows a first example of an inventive drive module being used at a front axle differential with an engine arranged in the longitudinal direction.
Figure 7:
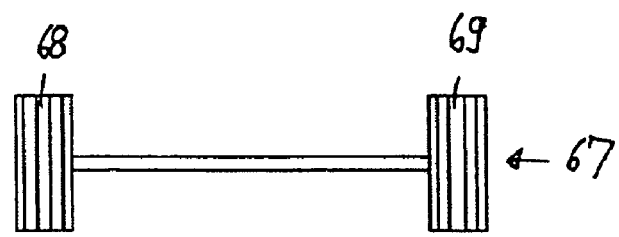

FIG. 7 shows the driveline of a motor vehicle having a driven front axle 66 and an unproven rear axle 67. The rear axle only shows the wheels 68, 69 without any suspension parts. For driving the front axle 66, there is provided a longitudinally positioned engine 70 with a gearbox assembly 71. The gearbox assembly comprises a standard transmission 72 and an axle differential 73 for distributing torque to the two side shafts 74, 75. Analogously to the embodiment according to FIG. 2 to whose description reference is hereby made, one inventive drive module 5, 6 per side shaft 74, 75 for the variable transmission of torque to the front driving wheels 76, 77 is attached to the axle differential 73. In this way, the torque introduced into the axle differential 73 can be variably distributed, as required, to the two side shafts 74, 75 and the two wheels 76, 77 respectively in order to achieve an optimum driving stability. More particularly, when negotiating a curve, an additional torque can be applied to the driving wheel on the outside of the curve.

Figure 8:
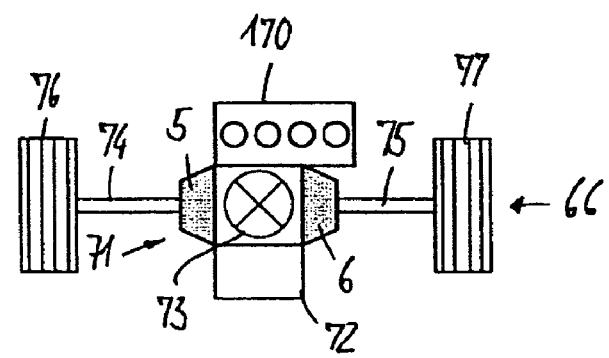
FIG. 8 shows a second example of an inventive drive module being used at a front axle differential with a transversely arranged engine.
Figure 8:
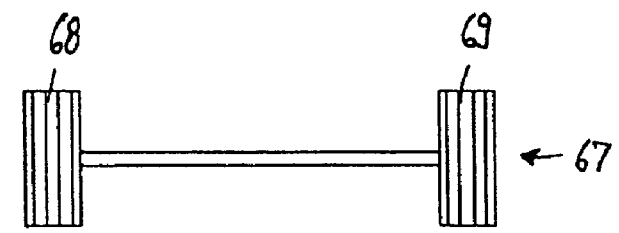

FIG. 8 shows an embodiment which is similar to that shown in FIG. 6 and to whose description reference is hereby made, the only difference being that in this case, the engine 170 is arranged transversely instead of longitudinally.

Figure 9:
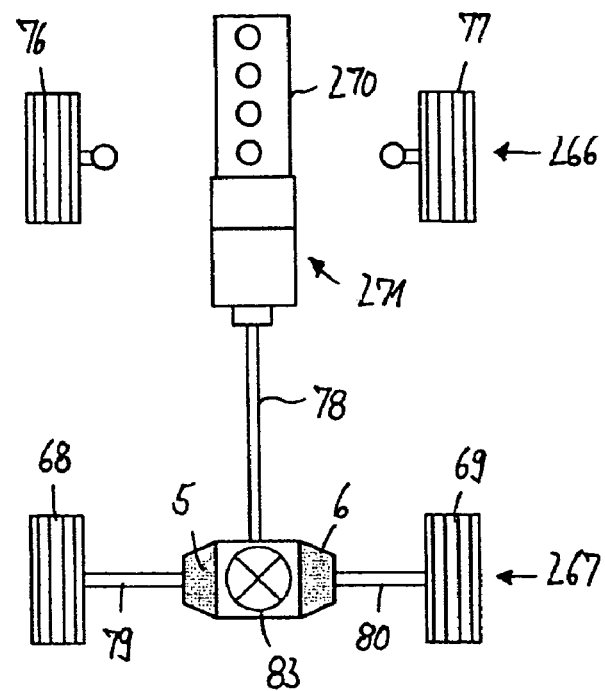
FIG. 9 shows a third example of an inventive drive module being used at a rear axle differential.

FIG. 9 in which the reference numbers of the components modified as compared to the components shown in FIG. 7 have been indexed by 200 shows the driveline of a motor vehicle having a driven rear axle 267 and an unproven front axle 266. Of the front axle 266 only the wheels 76, 77 are shown without the suspension parts. The axle differential 83 of the rear axle 267 is driven by an engine/gearbox unit 270, 271 via a propeller shaft 78. Analogously to the embodiment according to FIG. 2 to whose description reference is hereby made to that extent, one inventive drive module 5, 6, per side shaft 79, 80 for the variable transmission of torque to the rear driving wheels 68, 69 is attached to the axle differential 83. In this way, the torque introduced into the axle differential 83 can be variably distributed to the two side shafts 79, 80 and to the two driving wheels 68, 69 as required in order to achieve an optimum driving stability. More particularly, when negotiating curves, an additional torque can be applied to the driving wheel on the outside of the curve.

Figure 10:
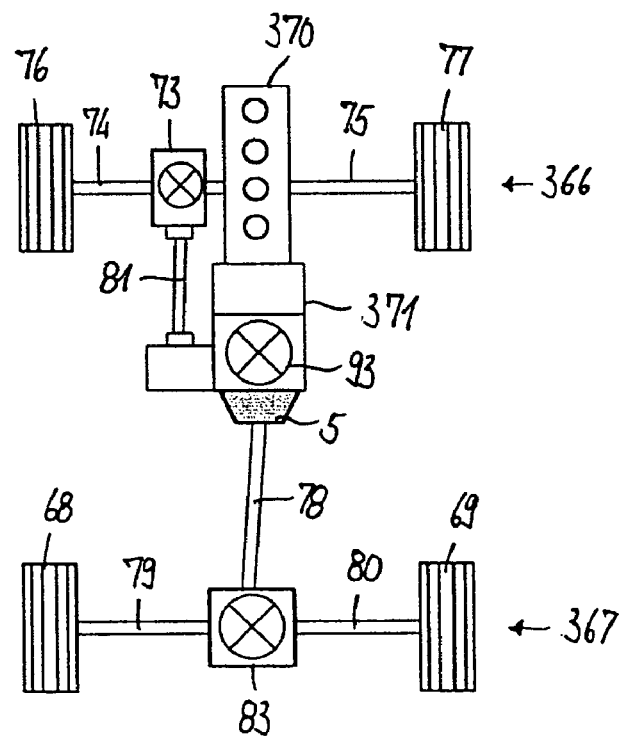
FIG. 10 shows a fourth example of an inventive drive module being used at a central differential.

FIG. 10 shows the driveline of a motor vehicle with a driven front axle 366 and a driven rear axle 367. The reference numbers of any modified components have been indexed by 300. The front axle 366 is shown to be provided with an axle differential 73, two side shafts 74, 75 and well as the driven driving wheels 76, 77. The rear axle 367 is shown to be provided with an axle differential 83, two side shafts 79, 80 as well as the driven driving wheels 68, 69. The engine/gearbox unit 370, 371 comprises a distributor box 371 with a fixed torque distribution whose output shafts, on the one hand, via a front propeller shaft 81, drive the axle differential 73 of the front axle 366 and, on the other hand, via a rear propeller shaft 78, drive the axle differential 83 of the rear axle 367. A central differential 93 which adapts the driving moments between the front axle 366 and the rear axle 367 in accordance with the prevailing slip is integrated into the distributor box 371. Similarly to the embodiment according to FIG. 2 to the description of which reference is hereby made, an inventive drive module 5 for variably distributing the torque between the front axle 366 and the rear axle 367 is connected to the central differential 93. In this way, under certain driving conditions, a higher torque can be applied to the rear axle 367 in order to achieve an optimum driving stability.

Figure 11:
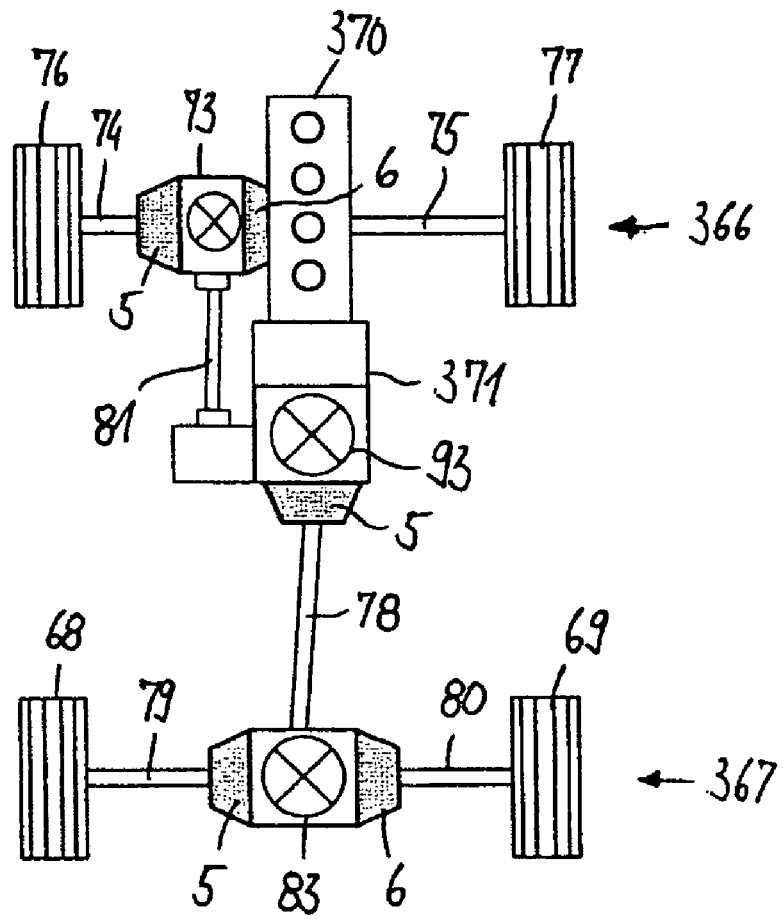
FIG. 11 shows a fifth example of an inventive drive module being used at a central differential.

FIG. 11 shows the driveline of a motor vehicle with a driven front axle 366 and a driven rear axle 367. The driveline as illustrated largely corresponds to that shown in FIG. 10 to the description of which reference is hereby made. Identical components have been given the same reference numbers. In contrast to the embodiment according to FIG. 9, the present embodiment, in addition to the central differential 93, comprises inventive drive modules 5, 6 which are connected to the axle differentials 73, 83. It is thus possible to ensure a variable distribution of torque to the two side shafts 74, 75 of the front axle 366 and to the two side shafts 79, 80 of the rear axle 367. In view of the inventive drive modules 5, 6 attached to the rear axle differential 83, reference is made to the driven driveline according to FIG. 9. In view of the inventive drive modules 5, 6 attached to the front axle differential 73, reference is made to the description of the driven driveline according to FIG. 7. The present embodiment ensures a maximum driving stability because both the distribution of torque between the front axle 366 and the rear axle 367 as well as within the front axle 366 and within the rear axle 367 to the respective side shafts 74, 75; 79, 80 is variable.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A drive module for a variable torque distribution in the driveline of a motor vehicle, comprising:
a first shaft which is rotatably supported around an axis of rotation (B) relative to a stationary housing;
a second shaft which is coaxially arranged relative thereto and which is drivingly connected to the first shaft;
a transmission stage arranged in a torque flow between the first shaft and the second shaft, said transmission stage having a carrier element which carries at least one planetary gear and which is able to rotate around the axis of rotation (B);
a multi-plate coupling axially supported in the housing and selectively coupling the carrier element relative to the housing, such that, when coupled, torque is transmitted from one of the first or the second shaft to the other one of the first or the second shaft;
wherein the housing, the first shaft, the second shaft, the transmission stage and the coupling form part of a unit, and wherein an attaching mechanism is provided at the housing for attaching the unit to a drive;
wherein the transmission stage comprises a first sun gear which is connected to the first shaft in a rotationally fixed way and which engages a first toothed portion of the at least one planetary gear; and a second sun gear which is connected to the second shaft in a rotationally fixed way and which engages a second toothed portion of the at least one planetary gear;
wherein the first and the second toothed portion of the at least one planetary gear are identical in design, and wherein the first and the second sun gear comprise different numbers of teeth relative to one another.

2. A drive module according to claim 1, wherein the multi-plate coupling comprises outer plates connected to the housing in a rotationally fixed way and inner plates connected to the carrier element in a rotationally fixed way, wherein the outer plates and the inner plates are arranged so as to alternate.

3. A drive module according to claim 2, wherein, at an outer circumferential face, the carrier element comprises an engaging mechanism which is engaged in a rotationally fixed way by the inner plates of the multi-plate coupling.

4. A drive module according to claim 1, wherein the carrier element is provided in the form of a basket in which the at least one planetary gear is received.

5. A drive module according to claim 1, wherein the carrier element is formed from plate metal.

6. A drive module according to claim 1, wherein the carrier element, the at least one planetary gear, the first sun gear and the second sun gear are parts of a pre-assembled unit adapted to be inserted into the housing.

7. A drive module according to claim 1, wherein the second sun gear and the second shaft are produced in one piece in the form of a hollow shaft, said hollow shaft being rotatably supported on the first shaft.

8. A drive module according to claim 1, wherein, at a side associated with the attaching mechanism, the housing comprises an aperture.

9. A drive module according to claim 1, wherein, at a side associated with the attaching mechanism, the housing comprises a cover, and an inner chamber of the housing is sealed towards the outside.

10. A drive module according to claim 1, wherein the attaching mechanism comprises a flange.

11. A drive module according to claim 1, wherein the unit comprises an axial setting device received in the housing for actuating the coupling.

12. A drive module according to claim 1, wherein said axial setting device comprises a ball ramp assembly controlled by an electric motor.

13. A drive module according to claim 12, wherein the ball ramp assembly comprises two discs which are rotatable relative to one another and which comprise pairs of ball grooves whose depth are circumferentially variable in opposite directions.

14. A drive module according to claim 13, wherein the two discs of the ball ramp assembly are arranged coaxially relative to the carrier element.

15. A drive module for a variable torque distribution in the driveline of a motor vehicle. comprising:
a first shaft which is rotatably supported around an axis of rotation (B) relative to a stationary housing:
a second shaft which is coaxially arranged relative to said first shaft and which is drivingly connected to the first shaft;
a transmission stage arranged in a torque flow between the first shaft and the second shaft, said transmission stage having a carrier element which carries at least one planetary gear and which is able to rotate around the axis of rotation (B);
a multi-plate coupling axially supported in the housing and selectively coupling the carrier element relative to the housing, such that, when coupled, torque is transmitted from one of the first or the second shaft to the other one of the first or the second shaft;
wherein the housing, the first shaft, the second shaft, the transmission stage and the coupling form part of a unit, and wherein an attaching mechanism is provided at the housing for attaching the unit to a drive;
wherein the carrier element comprises two carrier parts each formed in a cup shape, and connected to one another.

16. A motor vehicle comprising a driven axle with two sideshafts and an axle differential for variably distributing torque to the two sideshafts,
wherein the axle differential comprises a differential carrier rotatably supported in a stationary differential housing, two sideshaft gears rotatably supported in the differential carrier and a plurality of differential gears engaging the two sideshaft gears,
the vehicle further comprising a first drive module and a second drive module for a variable torque distribution in the driveline of a motor vehicle, said first and second drive module each comprising:
a first shaft which is rotatably supported around an axis of rotation (B) relative to a stationary housing;
a second shaft which is coaxially arranged relative thereto and which is drivingly connected to the first shaft;
a transmission stage arranged in a torque flow between the first shaft and the second shaft, said transmission stage having a carrier element which carries at least one planetary gear and which is able to rotate around the axis of rotation (B);
a coupling supported in the housing and selectively coupling the carrier element relative to the housing, such that, when coupled, torque is transmitted from one of the first or the second shaft to the other one of the first or the second shaft;
wherein the housing, the first shaft, the second shaft, the transmission stage and the coupling form part of a unit, and wherein an attaching mechanism is provided at the housing for attaching the unit to a drive;

wherein the housing of the first drive module is connected to the stationary differential housing, wherein the first shaft of the first drive module is connected in a rotationally fixed way to one of the two sideshaft gears and wherein the second shaft of the first drive module is connected in a rotationally fixed way to the differential carrier, wherein the housing of the second drive module is connected to the stationary differential housing, wherein the first shaft of the second drive module is connected in a rotationally fixed way to the other one of the two sideshaft gears and wherein the second shaft of the second drive module is connected in a rotationally fixed way to the differential carrier.

17. A motor vehicle comprising two driven axles with a central differential for variably distributing the torque to the two driven axles, wherein the central differential comprises a differential carrier rotatably supported in a stationary housing, two axle shaft gears rotatably supported in the differential carrier, and a plurality of differential gears engaging the axle shaft gears, the vehicle further comprising, at the central differential, a first drive module for a variable torque distribution in the driveline of a motor vehicle, comprising:

a first shaft which is rotatably supported around an axis of rotation (B) relative to a stationary housing;

a second shaft which is coaxially arranged relative thereto and which is drivingly connected to the first shaft;

a transmission stage arranged in a torque flow between the first shaft and the second shaft, said transmission stage having a carrier element which carries at least one planetary gear and which is able to rotate around the axis of rotation (B);

a coupling supported in the housing and selectively coupling the carrier element relative to the housing, such that, when coupled, torque is transmitted from one of the first or the second shaft to the other one of the first or the second shaft;

wherein the housing, the first shaft, the second shaft, the transmission stage and the coupling form part of a unit, and wherein an attaching mechanism is provided at the housing for attaching the unit to a drive;

wherein the housing of said drive module is connected to the stationary differential housing, wherein the first shaft of the first drive module is connected in a rotationally fixed way to one of the two axle shaft gears and wherein the second shaft of the first drive module is connected in a rotationally fixed way to the differential carrier.

18. A motor vehicle according to claim 17, wherein at least one of the driven axles comprises two sideshafts and an axle differential for variably distributing the torque to the two sideshafts, wherein the axle differential comprises a differential carrier rotatably supported in a stationary differential housing, two sideshaft gears rotatably supported in the differential carrier and a plurality of differential gears engaging the sideshaft gears, wherein the axle differential is associated with a second drive module and a third drive module for a variable torque distribution in the driveline of a motor vehicle, said second and third drive module each comprising:

a first shaft which is rotatably supported around an axis of rotation (B) relative to a stationary housing;

a second shaft which is coaxially arranged relative thereto and which is drivingly connected to the first shaft;

a transmission stage arranged in a torque flow between the first shaft and the second shaft, said transmission stage having a carrier element which carries at least one planetary gear and which is able to rotate around the axis of rotation (B);

a coupling supported in the housing and selectively coupling the carrier element relative to the housing, such that, when coupled, torque is transmitted from one of the first or the second shaft to the other one of the first or the second shaft;

wherein the housing, the first shaft, the second shaft, the transmission stage and the coupling form part of a unit, and wherein an attaching mechanism is provided at the housing for attaching the unit to a drive;

wherein the housing of the second drive module is connected to the stationary differential housing, wherein the first shaft of the second drive module is connected in a rotationally fixed way to one of the two sideshaft gears and wherein the second shaft of the second drive module is connected in a rotationally fast way to the differential carrier;

wherein the housing of the third drive module is connected to the stationary differential housing, wherein the first shaft of the third drive module is connected in a rotationally fixed way to the other one of the two sideshaft gears, and wherein the second shaft of the third drive module is connected in a rotationally fixed way to the differential carrier.

* * * * *